United States Patent
Kuckelkorn et al.

(10) Patent No.: US 7,806,115 B2
(45) Date of Patent: Oct. 5, 2010

(54) TUBULAR RADIATION ABSORBING DEVICE FOR A SOLAR POWER PLANT WITH IMPROVED EFFICIENCY

(75) Inventors: Thomas Kuckelkorn, Weiden (DE); Nikolaus Benz, Weiden (DE)

(73) Assignee: Schott AG, Mainz (DE)

( * ) Notice: Subject to any disclaimer, the term of this patent is extended or adjusted under 35 U.S.C. 154(b) by 397 days.

(21) Appl. No.: 11/562,233

(22) Filed: Nov. 21, 2006

(65) Prior Publication Data
US 2007/0235024 A1    Oct. 11, 2007

(30) Foreign Application Priority Data
Nov. 25, 2005    (DE) ................ 10 2005 057 276

(51) Int. Cl.
*F24J 2/24*    (2006.01)
(52) U.S. Cl. .............. 126/654; 126/652; 126/653
(58) Field of Classification Search ............. 126/654, 126/653, 652, 656; 428/34; 219/616; 222/34, 222/3; 137/72
See application file for complete search history.

(56) References Cited

U.S. PATENT DOCUMENTS

| | | | |
|---|---|---|---|
| 4,306,543 A * | 12/1981 | Doevenspeck et al. ...... | 126/638 |
| 4,770,232 A * | 9/1988 | Chubb .......................... | 165/41 |
| 4,834,066 A * | 5/1989 | Collins et al. ................ | 126/654 |
| 6,758,211 B1* | 7/2004 | Schmidt ....................... | 126/652 |
| 6,832,608 B2* | 12/2004 | Barkai et al. ................. | 126/653 |
| 7,013,887 B2 | 3/2006 | Kuckelkorn et al. | |
| 2004/0050381 A1 | 3/2004 | Kuckelkorn et al. | |

FOREIGN PATENT DOCUMENTS

| | | |
|---|---|---|
| DE | 198 21 137 | 11/1999 |
| DE | 102 31 467 | 2/2004 |
| WO | 2004/063640 | 7/2004 |

* cited by examiner

*Primary Examiner*—Kenneth B Rinehart
*Assistant Examiner*—Chuka C Ndubizu
(74) *Attorney, Agent, or Firm*—Michael J. Striker

(57) ABSTRACT

The tubular radiation absorbing device (1) for solar thermal applications has a central tube (2) and a glass tubular jacket (3) surrounding the central tube (2) so that a ring-shaped space (4) is formed between the central tube (2) and the tubular jacket (3). The ring-shaped space (4) contains at least one inert gas with a partial pressure of 3 to 200 mbar. Alternatively in another embodiment a gas-tight closed container (10) filled with at least one inert gas is arranged in the ring-shaped space (4). The container (10) has a device for supplying inert gas to the ring-shaped space (4) in order to compensate for increased heat losses due to diffusion of hydrogen into the ring-shaped space (4) from the heat carrier medium.

9 Claims, 2 Drawing Sheets

TUBULAR RADIATION ABSORBING DEVICE FOR A SOLAR POWER PLANT WITH IMPROVED EFFICIENCY

CROSS-REFERENCE

The invention described and claimed hereinbelow is also described in German Patent Application 10 2005 057 276.6-15, filed Nov. 25, 2005 in Germany, which provides the basis for a claim of priority under 35 U.S.C. 119.

BACKGROUND OF THE INVENTION

1. Field of the Invention

The present invention relates to a tubular radiation absorbing device for solar thermal applications, especially for a parabolic trough collector in a solar power plant, which comprises a central tube and a glass tubular jacket surrounding the central tube so as to form a ring-shaped space between the tubular jacket and the central tube.

2. Related Art

Tubular radiation absorbing devices or absorber pipes are used in parabolic trough collectors to utilize solar radiation. The solar radiation is concentrated by a tracking mirror on a tubular radiation absorbing device and converted into heat. The heat is conducted away by a heat-carrying medium passing through the tubular radiation absorbing device and is used directly as process heat or converted into electrical energy.

This sort of tubular radiation absorbing device typically comprises a coated central tube and a glass tubular jacket around it. The ring-shaped space between the tubes is evacuated. In operation a heat carrier fluid, especially an oil, is pumped through the central tube.

This sort of absorber tube is described, e.g., in DE 102 31 467 B4. A glass-metal transitional element is arranged at the free end of a glass tubular jacket. The central tube and the glass-metal transitional element are connected with each other so that they are movable longitudinally relative to each other by means of at least one expansion compensating device.

The operating temperature range of the tubular radiation absorbing device is between 300° C. and 400° C. for solar power generation.

Free hydrogen, which is dissolved in the heat carrier medium, is generated by aging of the heat carrier fluid. This hydrogen arrives in the evacuated ring-shaped space between the central tube and the glass tubular jacket by permeation through the central tube. The permeation rate increases with increasing operating temperature, which is between 300° C. and 400° C., so that the pressure in the ring-shaped space rises. This pressure increase leads to increased heat losses and to a reduced efficiency of the tubular radiation absorbing device.

Suitable measures must then be taken to maintain a vacuum in the ring-shaped space. One measure that is taken to remove hydrogen is to combine it with a suitable material.

Getter material, which combines or reacts with the hydrogen gas that penetrates through the central tube into the ring-shaped space, is arranged in the ring-shaped space to maintain the vacuum. When the capacity of the getter material is exhausted, the pressure rises in the ring-shaped space until the partial pressure of the free hydrogen in the ring-shaped space reaches equilibrium with the hydrogen dissolved in the heat carrier medium. The equilibration pressure of the hydrogen in the ring-shaped space amounts to between 0.3 mbar and 3 mbar in the known absorber tubes. There is an increase in heat conduction in the ring-shaped space because of the presence of hydrogen in it. The heat losses due to heat conduction are about five times higher compared to air, i.e. clearly higher than with an absorber tube that has not been evacuated.

A getter arrangement is described in WO 2004/063640 A1, in which a getter strip is arranged between the central tube and the tubular jacket in the ring-shaped space. This arrangement has the disadvantage that the strip is in a region, which can be exposed to direct radiation. The getter strip can be heated especially by radiation coming from the mirror that misses the central tube or strikes it but is largely reflected from it. Since the getter strip is nearly thermally isolated from the central tube and the tubular jacket in a vacuum, the temperature of the getter strip can vary greatly with varying irradiation conditions. Because the getter material with a predetermined loading degree has a temperature-dependent equilibrium pressure (equilibrium between gas desorption and adsorption), temperature fluctuations of the getter material lead to undesirable pressure fluctuations. The temperature of the tubular jacket greatly increases after consumption of the getter material and the absorber tube becomes unusable.

SUMMARY OF THE INVENTION

It is an object of the present invention to provide a tubular radiation absorbing device that has lower heat losses than conventional tubular radiation absorbing devices of the above-described prior art type.

This object is attained by a tubular radiation absorbing device, in which the ring-shaped space contains at least one inert gas, whose partial pressure is in a range between 3 to 200 mbar.

In this partial pressure range the thermal conductivity of the gas is independent of pressure. At higher pressure convection occurs. The ring-shaped space should preferably be evacuated prior to filling with the inert gas.

Of course it has been shown that an inert gas or an inert gas mixture can not stop diffusion of hydrogen from the central tube, but it can definitely reduce the unwanted thermal conduction in the ring-shaped space, when the thermal conductivity is dominated by the presence of the inert gas or the inert gas mixture. This is the case when the inert gas has a partial pressure of from 3 to 200 mbar, since the hydrogen equilibrium pressure is less than 5 mbar.

The contribution of the hydrogen to the gas conduction process is reduced by the presence of the inert gas in the ring-shaped space. At the same time heat losses arise due to the inert or noble gas that dominates the heat conduction process. However these heat losses are definitely less than those caused by pure hydrogen.

Preferred values of the partial pressure of the inert gas are in a range from 10 to 100 mbar, especially 10 to 75 mbar.

Xenon or krypton is preferred as the inert gas.

The partial pressure of the inert gas is preferably selected so that the molar mixture ratio of inert gas to hydrogen is as large as possible.

The partial pressure of the inert gas is preferably adjusted according to the hydrogen equilibrium pressure so that the molar mixture ratio of the noble gas to hydrogen is greater than or equal to 5. A molar ratio of greater than or equal to 8, especially 10, is particularly preferred.

The tubular radiation absorbing device can be additionally equipped with getter material in the ring-shaped space. The hydrogen, which permeates the ring-shaped space, is taken up by the getter material until the getter capacity is exhausted. Until this time is reached the gas thermal conductivity is determined by the pure inert or noble gas. The gas thermal conductivity is slightly reduced after reaching the maximum getter load, because the gas thermal conductivity of the mixture of the hydrogen and inert gas is somewhat higher than that of the pure inert or noble gas.

According to a second embodiment the object of the present invention is attained by at least one gas-tight, closed container filled with at least one inert gas arranged in the ring-shaped space and means for conducting the inert gas from the container into the ring-shaped space.

This embodiment has the advantage that the inert gas can be conducted into the ring-shaped space when it is actually required.

This is especially true for a tubular radiation absorbing device, which is additionally equipped with getter material. When the getter material is consumed, the inert gas can be released from the container, in order to again reduce the thermal conductivity in the ring-shaped space to an appropriate small value. Because of that the tubular radiation absorber can be operated with only slightly increased heat losses beyond the getter service life. The container can also be opened, when an increased aging of the heat carrier medium would result from operating problems and thus produce an increased hydrogen pressure and a premature consumption of the getter material.

In order to open the container without requiring intervention from outside of the device, the container is provided with at least one outlet, which is closed by a closure material that opens the outlet when heated.

Preferably the closure material comprises a metallic solder with a melting point of over 500° C.

In order to be able to provide the required heat to melt the closure material, a heating means is provided in the region in which the outlet is located.

It is advantageous when the outlet is opposite to the tubular jacket. That means that the outlet is directed to or points toward the outside of the device.

According to a preferred embodiment the container is at least partially made from an electrically conductive material.

Inductive heating of the container and melting of the closure material is then possible by means of an electrical coil mounted on the outside of the tubular jacket opposite to the container. The aforesaid means for heating or heating means comprises the electrical coil.

This coil can be installed so that it is fixed in position or it is possible to manage the opening of the container or the outlet of the container with a mobile device, which is held on the tubular jacket.

In larger plants with a plurality of tubular radiation absorbing devices the inert gas containers that should be opened can be identified by temperature measurements of the tubular jackets of the devices. Maintenance personnel can heat the indicated containers by means of a mobile induction heating device after the temperature measurement in order to release the noble or inert gas into the ring-shaped spaces.

Preferably the container is a hollow cylinder. The cylinder axis of the hollow cylinder is preferably perpendicular to the longitudinal axis of the tubular radiation absorbing device.

According to an additional embodiment the outlet of the container is provided with a connector. The connector itself does not need to have any special design in order to make inductive heating possible.

In this embodiment the outlet is provided at the end of the connector. In order to make heating possible and to make the construction of the device independent, a metal ring is attached to the connector over the outlet with a sealing material. The inductive heating of the ring heats and eventually melts the sealing material. This is advantageous when the ring is attached, e.g. off-center over the outlet, so that the outlet is opened by melting the sealing material. This can occur, for example, by suitable arrangement of its position at the outlet. In addition the arrangement can provide so that the ring, e.g., can fall off the outlet.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
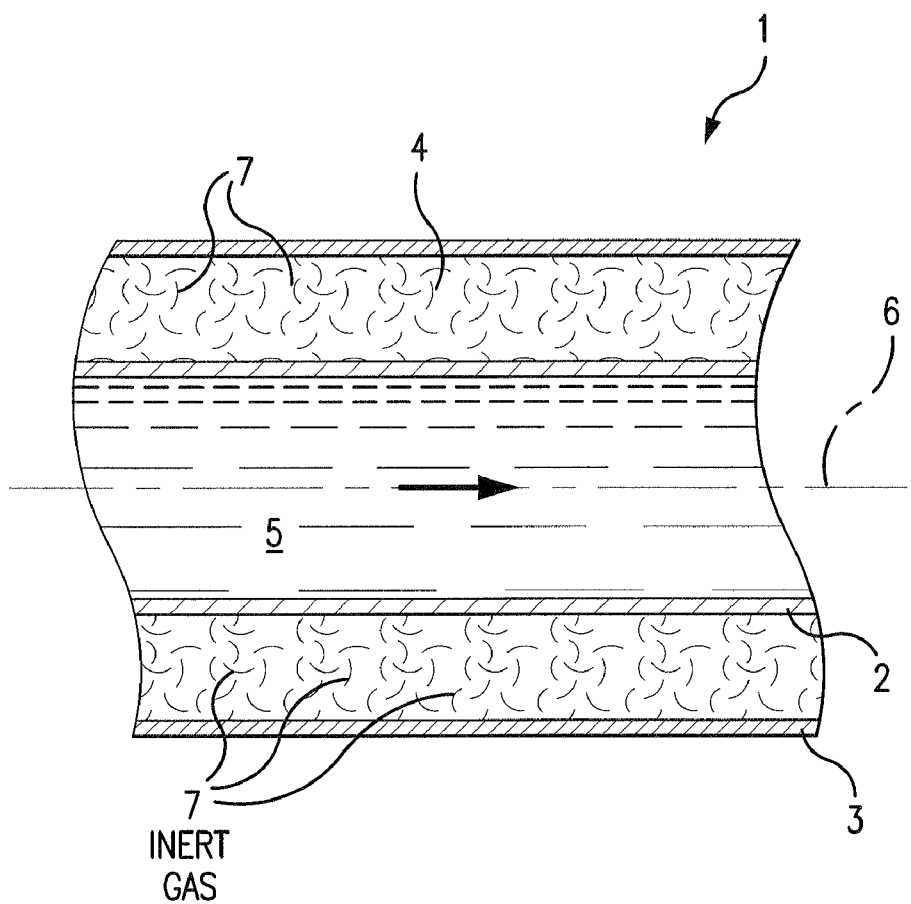
FIG. 1 is a cutaway cross-sectional view through a section of a tubular radiation absorbing device in which the space between the tubular jacket and the central tube is filled with a noble gas according to the invention.

The tubular radiation absorbing device 1 includes a central tube 2 made from metal, which is shown in FIG. 1 and is provided with an unshown coating on its outer side. A heat carrier fluid 5, which releases hydrogen as it ages, flows through this central tube 2 in the direction of the arrow. The released hydrogen can then diffuse through the metal central tube 2.

The tubular radiation absorbing device 1 has a glass tubular jacket 3 surrounding the central tube 2, whereby a ring-shaped space 4 is formed between them. In the first embodiment shown in FIG. 1 the free hydrogen generated in the central tube 2 reaches the ring-shaped space 4. Heat conduction, which leads to heat losses, occurs because of the hydrogen transport. However the ring-shaped space 4 contains an inert gas 7 that fills the ring-shaped space 4, so that the heat conduction due to the hydrogen transport is reduced.

Figure 2:
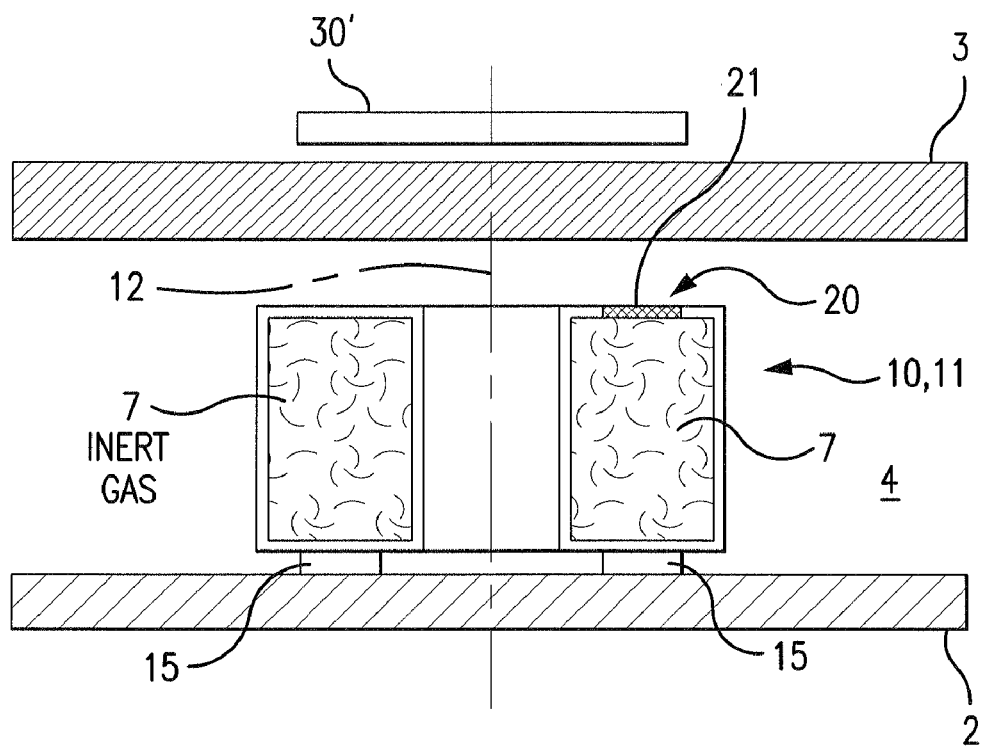
FIG. 2 is a cross-sectional view of one embodiment of a tubular radiation absorbing device according to the invention with a container filled with inert gas.

According to the embodiment of the invention shown in FIG. 2, which only shows a section of the ring-shaped space 4, this is prevented by providing a container 10 for an inert gas, which is arranged between the central tube 2 and the tubular jacket 3. This container 10 is attached to a central tube 2 by means of a holder 15. The cylindrical axis 12 of the container 10 is perpendicular to the longitudinal axis 6 of the central tube 2 or the device 1, which is shown in FIG. 1. This ring-shaped design has the advantage that the entire container 10 can be inductively heated by means of an electrical coil 30' that is mounted on the outer side of the tubular jacket 3. The container 10 comprises an electrically conductive material for this purpose.

An outlet 20 is provided on the upper side of the container 10 facing the tubular jacket 3. The outlet 20 is initially closed by a sealing material 21, especially a solder. In operation the sealing material 21 is melted by the inductive heating, so that the outlet 20 is opened and the inert gas 7 in the interior of the container 10 can escape from the container 10 into the ring-shaped space 4.

Figure 3:
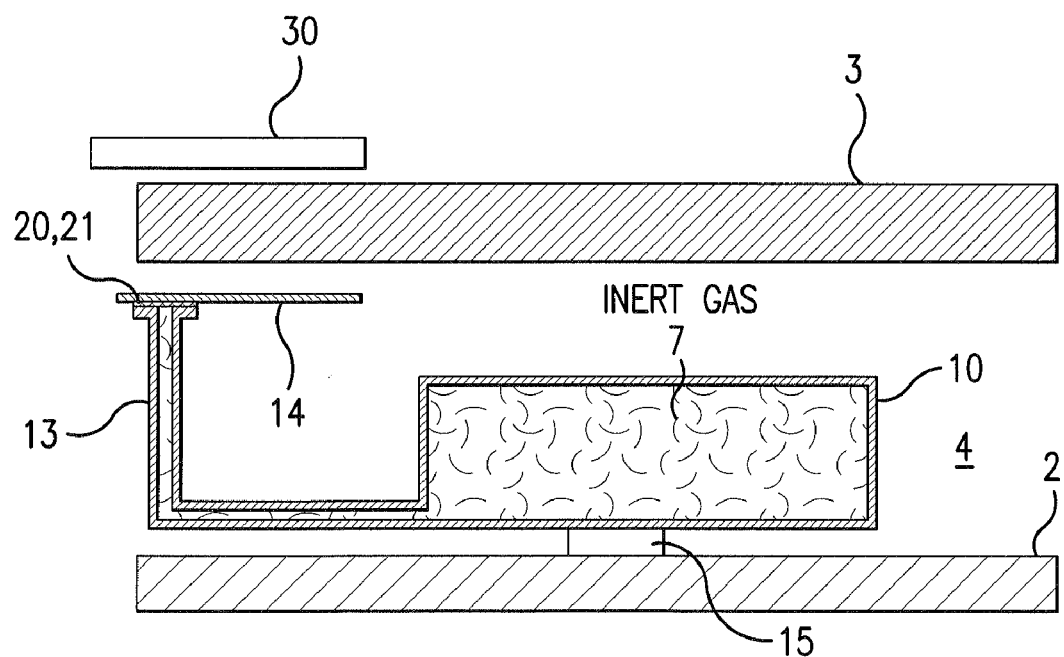
FIG. 3 is a cross-sectional view of another embodiment of a tubular radiation absorbing device according to the invention with another container filled with inert gas.

According to the alternative embodiment of the invention shown in FIG. 3, the container has a prismatic or quadrilateral shape, i.e. a rectangular cross-section. The container 10 has an outlet connector 13, which is bent in the direction of the tubular jacket 3. Accordingly the outlet 20 is next to or adjacent the tubular jacket 3. The outlet 20 is closed similarly with a sealing material 21, which melts when heated so that the outlet 20 is opened.

In order to be able to manage heating of the sealing material 21, a metallic ring 14 is attached to the top of the outlet connector 13 over the outlet 20 by a sealing material 21, which can be heated inductively by an electrical or induction coil 30 arranged outside of the tubular absorber device 1. The ring 13 is heated by induction, which causes the sealing material 21 to melt. Because of that the ring 14 is released and off the top of the connector 13 because of its off-center arrangement on the outlet 20. Then the outlet 20 is completely open and the inert gas 7 can escape from the container 10.

EXAMPLE

A tubular radiation absorbing device 1 comprises a central tube 2 with a 70 mm diameter and a glass tubular sleeve 3 with a diameter of 125 mm. The unshown coating on the central tube has a thermal emissivity of 14% at 400° C.

The ring-shaped space 4 between the central tube 2 and the tubular jacket 3 is evacuated and the central tube 2 is heated to 400° C. The tubular jacket reaches a temperature of about 60° C. by radiative heating with free convection on its outside. The heat losses of the central tube 2, which in this case are produced only by radiative heat transfer between the central tube 2 and the tubular jacket 3, are about 400 watts per meter of length along the absorber tube.

If the ring-shaped space 4 is filled with diffusing hydrogen at a pressure of 1 mbar, the heat losses are increased by the gas conduction by about 600 watts per meter of tube length to about 1000 W per meter. The temperature of the tubular sleeve 3 increases to about 200° C. and the gas filling the ring-shaped space 4 reaches an average temperature of about 270° C. The thermal conductivity of hydrogen at this temperature amounts to 0.27 W/mK.

When xenon is the inert gas 7 released into the ring-shaped space 4 and when the xenon has a partial pressure, e.g. of 10 mbar, a gas mixture of xenon and hydrogen is produced in the ring-shaped space 4, which has a molar ratio of 10:1. The thermal conductivity of the mixture decreases from 0.27 W/mK to 0.015 W/mK. Then the temperature of the tubular jacket 3 drops to about 90° C. and the average temperature in the ring-shaped space 4 drops to about 200° C. The heat losses due to thermal conductivity then decrease by 600 W per meter of tube length to 50 W per meter of tube length.

The term "inert gas" encompasses non-reactive gases including those in Group VIIIa or 8a of the periodic table, namely helium, neon, argon, krypton, xenon, and radon, especially krypton and xenon.

PARTS LIST 1 tubular radiation absorbing device
2 central tube
3 tubular jacket
4 ring-shaped space
5 heat carrier fluid
6 longitudinal axis of the central tube or absorbing device
7 inert gas
10 container
11 hollow cylinder
12 cylinder axis
13 outlet connector
14 metal ring
15 holder
20 outlet
21 sealing material
30 electrical coil While the invention has been illustrated and described as embodied in a tubular radiation absorbing device for a solar power plant with improved efficiency, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A tubular radiation absorbing device (1) for solar thermal applications, with a collector in a solar power plant, said tubular radiation absorbing device (1) comprising
    a central tube (2);
    a tubular jacket (3) comprising glass and surrounding the central tube so as to form a ring-shaped space (4) between the tubular jacket and the central tube;
    at least one gas-tight, closed container (10) filled with at least one inert gas (7) and arranged in said ring-shaped space (4), said at least one gas-tight, closed container (10) being provided with at least one outlet (20) and a sealing material closing said at least one outlet (20) and said at least one inert gas being selected from the group consisting of helium, neon, argon, krypton, xenon and radon; and
    means for heating the at least one gas-tight, closed container (10) and melting the sealing material closing said at least one outlet (20) so as to open said at least one outlet and thus release said at least one inert gas into said ring-shaped space (4).

2. The tubular radiation absorbing device (1) as defined in claim 1, wherein said sealing material is a metallic solder.

3. The tubular radiation absorbing device (1) as defined in claim 1, wherein said at least one outlet (20) is adjacent or next to said tubular jacket (3).

4. The tubular radiation absorbing device (1) as defined in claim 1, wherein said at least one gas-tight, closed container (10) comprises an electrically conducting material.

5. The tubular radiation absorbing device (1) as defined in claim 1, wherein said at least one container (10) is a hollow cylinder (11).

6. The tubular radiation absorbing device (1) as defined in claim 5, wherein said hollow cylinder (11) has a cylinder axis (12) and said cylinder axis (12) is perpendicular to a longitudinal axis (6) of the central tube (2).

7. The tubular radiation absorbing device (1) as defined in claim 1, wherein said means for heating said at least one gas-tight closed container and melting said sealing material comprises an electrical coil (30') mounted on an outer side of the tubular jacket (3) opposite from the at least one container (10).

8. The tubular radiation absorbing device (1) as defined in claim 1, wherein said at least one gas-tight, closed container (10) includes an outlet connector (13), said outlet connector (13) is provided with said the at lease one outlet (20) at one end thereof and a metal ring (14) is mounted on or attached to the outlet connector (13) over the at least one outlet (20) with said sealing material (21).

9. The tubular radiation absorbing device (1) as defined in claim 8, wherein said metal ring (14) closes said at least one outlet (20) until said metal ring (14) is heated in order to melt the sealing material (21) and release or detach said metal ring (14), thus opening the at least one outlet (20).

* * * * *